United States Patent [19]

Abrahamson

[11] Patent Number: 4,505,386
[45] Date of Patent: Mar. 19, 1985

[54] TACKLE BOX

[75] Inventor: Thomas C. Abrahamson, Ludington, Mich.

[73] Assignee: Harrington Tool Company, Ludington, Mich.

[21] Appl. No.: 547,468

[22] Filed: Oct. 31, 1983

[51] Int. Cl.³ .................. B65D 85/00; B65D 51/24
[52] U.S. Cl. .............................. 206/315.11; 220/23; 312/73
[58] Field of Search ............ 206/315.11, 362.1; 220/23; 224/226; 312/73, 306, 285, 184; 43/57.5

[56] References Cited

U.S. PATENT DOCUMENTS

| | | | |
|---|---|---|---|
| 899,466 | 9/1908 | O'Leary | 206/315.11 |
| 1,566,860 | 12/1925 | Hainzigianis | 206/362.1 |
| 2,580,912 | 1/1952 | Hawthorne | 224/226 |
| 2,675,640 | 4/1954 | Adamek | 206/315.11 |
| 2,919,169 | 12/1959 | Jackson | 220/23 |

Primary Examiner—William T. Dixson, Jr.
Attorney, Agent, or Firm—Glenn B. Morse

[57] ABSTRACT

The tackle box has upper and lower trays surrounded by a wall defining a space in which lures can be suspended from the underside of the upper tray. A handle operates a vertical shaft slideable with respect to the lower tray to lift the upper tray and bring the lures far enough above the upper edge of the wall to expose the lures and provide access to the lower tray.

6 Claims, 13 Drawing Figures

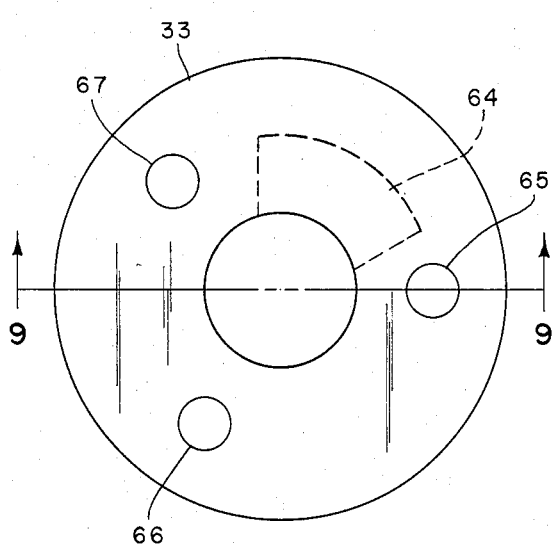
FIG. 8
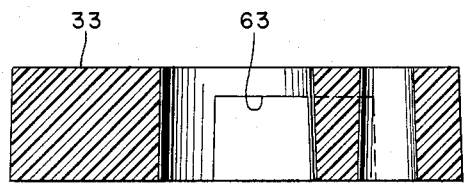
FIG. 9
FIG. 12
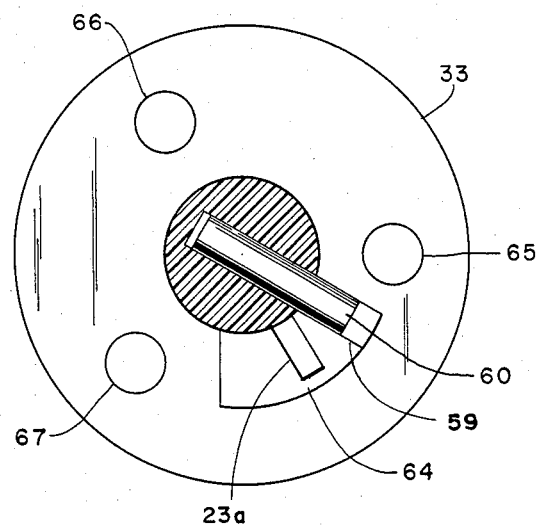
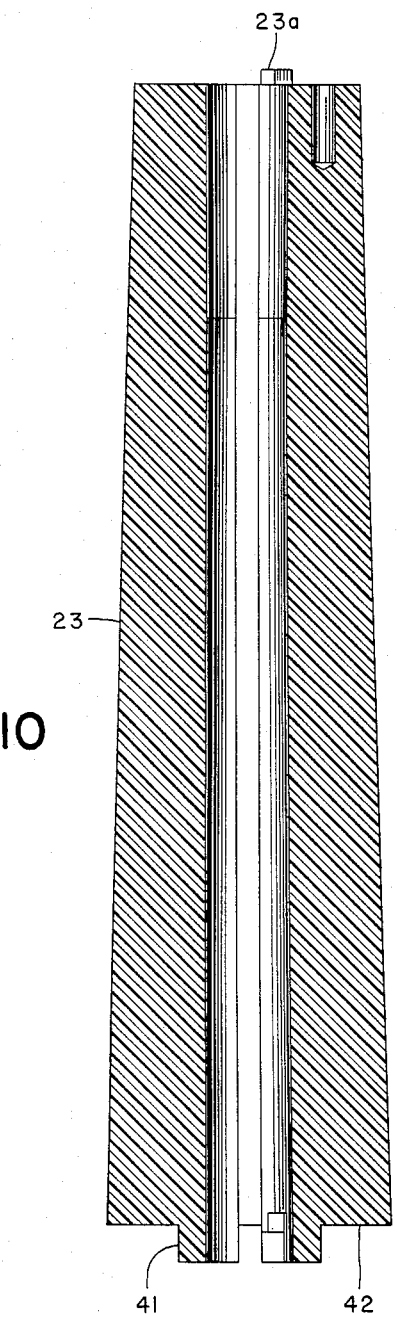
FIG. 10
FIG. 11
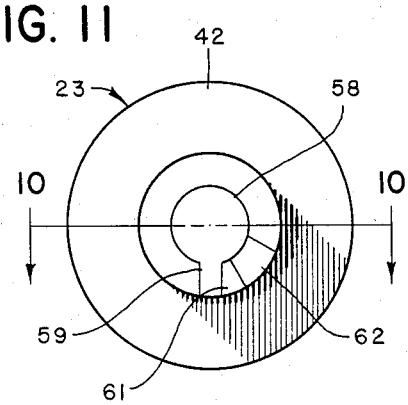

TACKLE BOX

BACKGROUND OF THE INVENTION

Boxes with various arrangements of trays and compartments are commonly used as containers for fishing tackle, tools, and other small items. The trays are usually divided into compartments, and commonly move somewhat with the cover as the cover is opened, in order to expose the interior of the box below the trays. The cover is commonly hinged, and connected to the moveable trays by some form of linkage that produces a combined vertical and lateral movement such that successive levels of trays are shifted sufficiently so that the upper trays do not obstruct access to the lower ones when the cover is fully opened. Similarly, the lower trays no longer obstruct the access to the lower interior of the box.

The storage of fishing lures in a horizontal position, as is necessary in such compartments, has a tendency to result in a snarled interengagement of the hooks to the point of testing the patience of the fisherman as he attempts to disengage them for use. It is also obvious that the usual lateral shifting of the trays on opening of these boxes exposes the trays and the interior of the box to either rain or spray from the boat. The present invention is directed at the elimination of these problems.

SUMMARY OF THE INVENTION

The tackle box provided by this invention has a lower tray forming the bottom of the structure, and a central tubular post secured to this lower tray. A vertical shaft is slideable within this post, and also traverses an upper tray, with the sliding movement of the shaft with respect to the upper tray being limited by a transverse abutment on the shaft. A wall surrounds both trays, and is fixed with respect to the lower tray. The upper tray forms a cover to the container defined by the wall and the lower tray, and the cover can be elevated by lifting the handle so that lures suspended from the underside of the upper tray become accessible, as is also the contents of the lower tray. A cover for the upper tray is also preferably traversed by the handle, and is rotatable with respect to it. A sector-shaped opening in this cover permits it to be indexed rotatably to expose the contents of various sector compartments in the upper tray. A locking arrangement is provided to maintain the container in the closed and also in the elevated open positions.

DESCRIPTION OF THE DRAWINGS

FIG. 8 is a top view of the cap for the post.

FIG. 9 is a section on the plane 9—9 of FIG. 8.

FIG. 10 is an axial section of the post.

FIG. 11 is a bottom view of the post.

FIG. 12 is a section above the post, showing the system for locking the assembly in the elevated position.

DESCRIPTION OF THE PREFERRED EMBODIMENT

Figure 1:
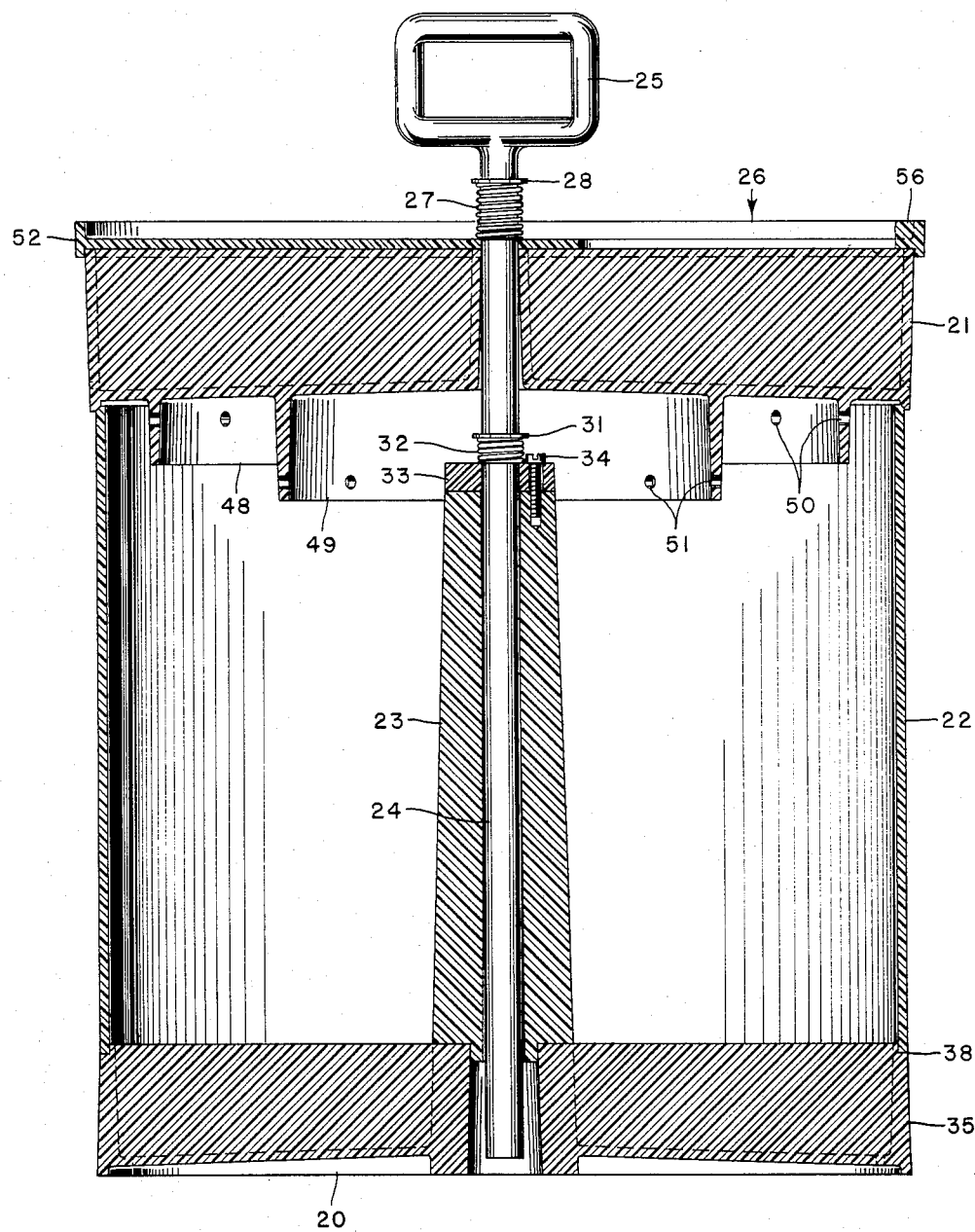
FIG. 1 is an axial section of the preferred form of the invention, in the closed position.
Figure 6:
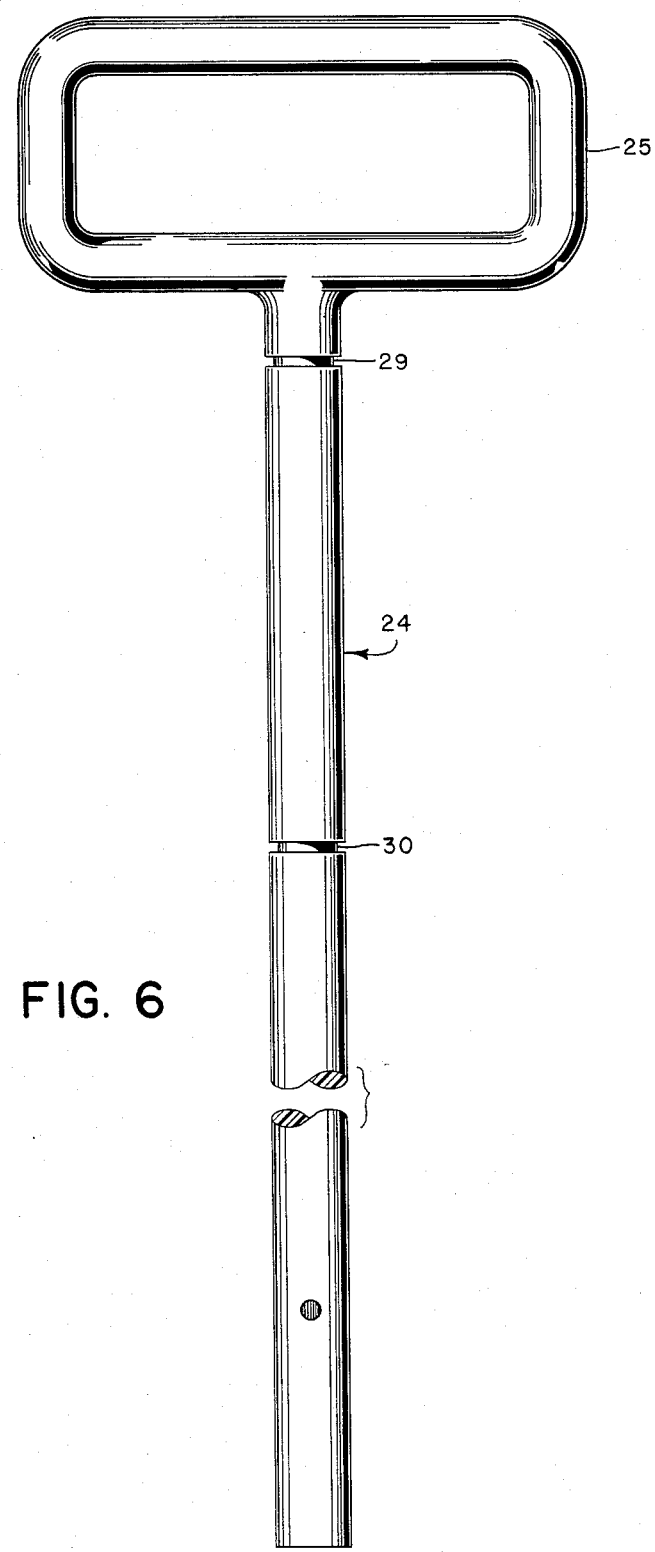
FIG. 6 is a elevation of the handle and shaft unit.
Figure 7:
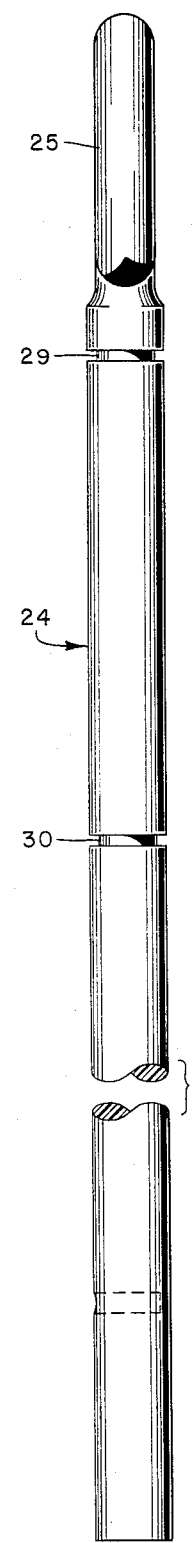
FIG. 7 is a side view with respect to FIG. 6.

Referring to the drawings, the lower tray 20 and the upper tray 21, together with the surrounding wall 22, define a space in which stored items may be protected. The wall 22 is adhesively secured to the lower tray, but is not fixed with respect to the upper tray 21. The central tubular post 23 is also adhesively secured to the lower tray 20, and the shaft 24 is slideable within the post. The shaft 24 terminates at its upper end in the handle configuration 25. The cover 26 is rotatable on the shaft 24, and is pressed lightly downward onto the upper tray by the action of the spring 27 acting between the cover and the clip 28 received in the groove 29 (refer to FIG. 6) in the shaft 24. A lower groove 30 in the shaft 24 receives the clip 31 providing an abutment for the upper end of the spring 32 acting against the cap 33 secured to the post 23 by screws as shown at 34 in FIG. 1.

Figure 5:
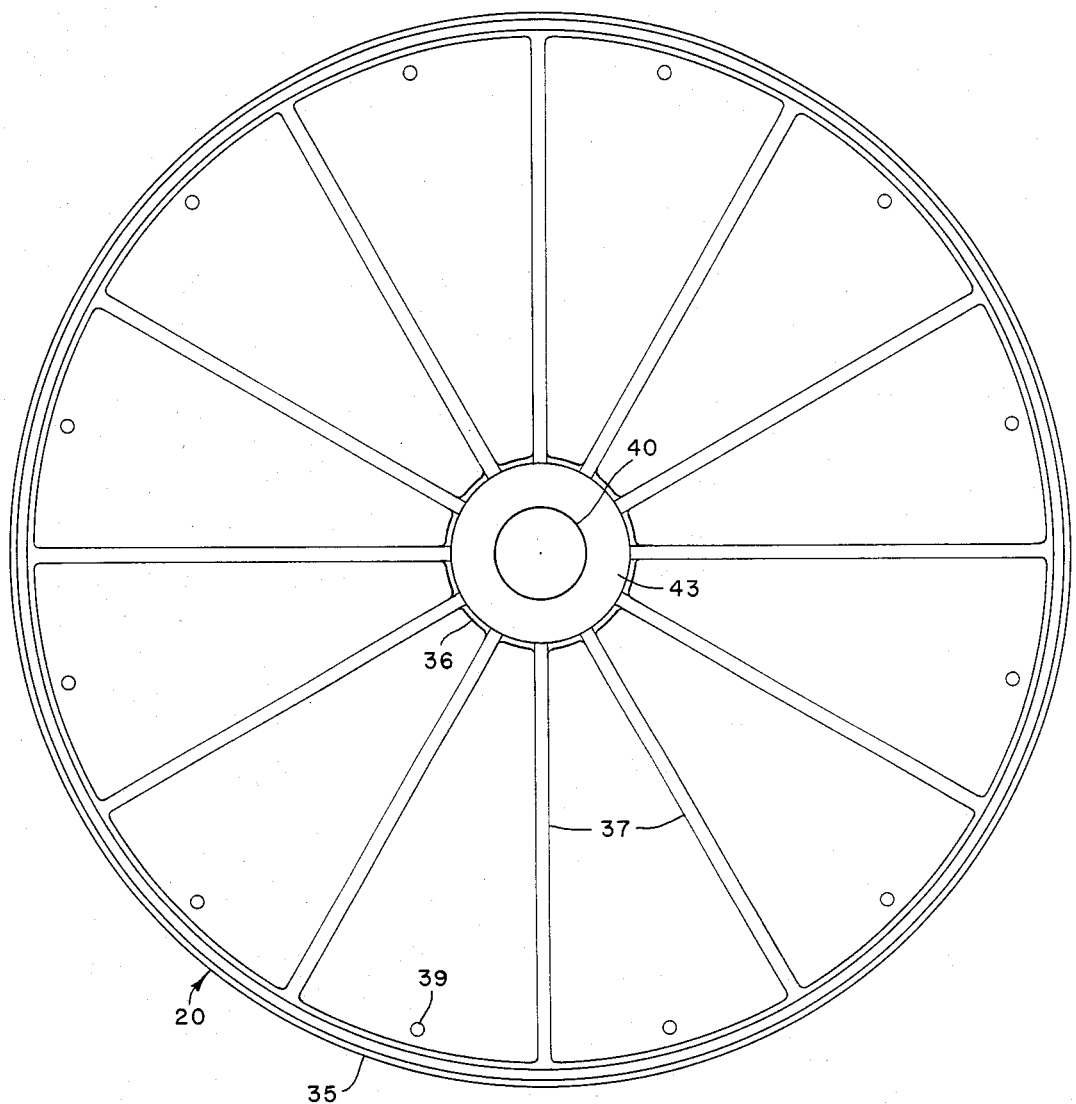
FIG. 5 is a top view of the lower tray.
Figure 13:
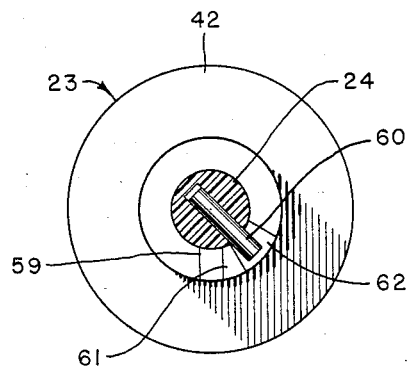
FIG. 13 is a section at the bottom of the post showing the locking system for securing the assembly in the closed position.

Referring to FIG. 5, the lower tray 20 has a peripheral flange 35 and a central boss 36 interconnected by radial partitions as shown at 37 to form sector-shaped receptacles for storing various items of fishing tackle such as sinkers, swivels, and so forth. The peripheral flange 35 has an offset shown at 38 in FIG. 1 for receiving the lower end of the wall 22, and this juncture is secured with conventional adhesive. Each of the sector-shaped compartments shown in FIG. 5 is provided with a drain hole as shown at 39.

The central boss 36 of the lower tray has a bore 40 receiving the lower extension 41 of the central tubular post 23. The radially outer bottom surface 42 of the tubular post rests against the top surface 43 of the central boss 36 of the lower tray, and this junction is permanently secured with adhesive.

Figure 4:
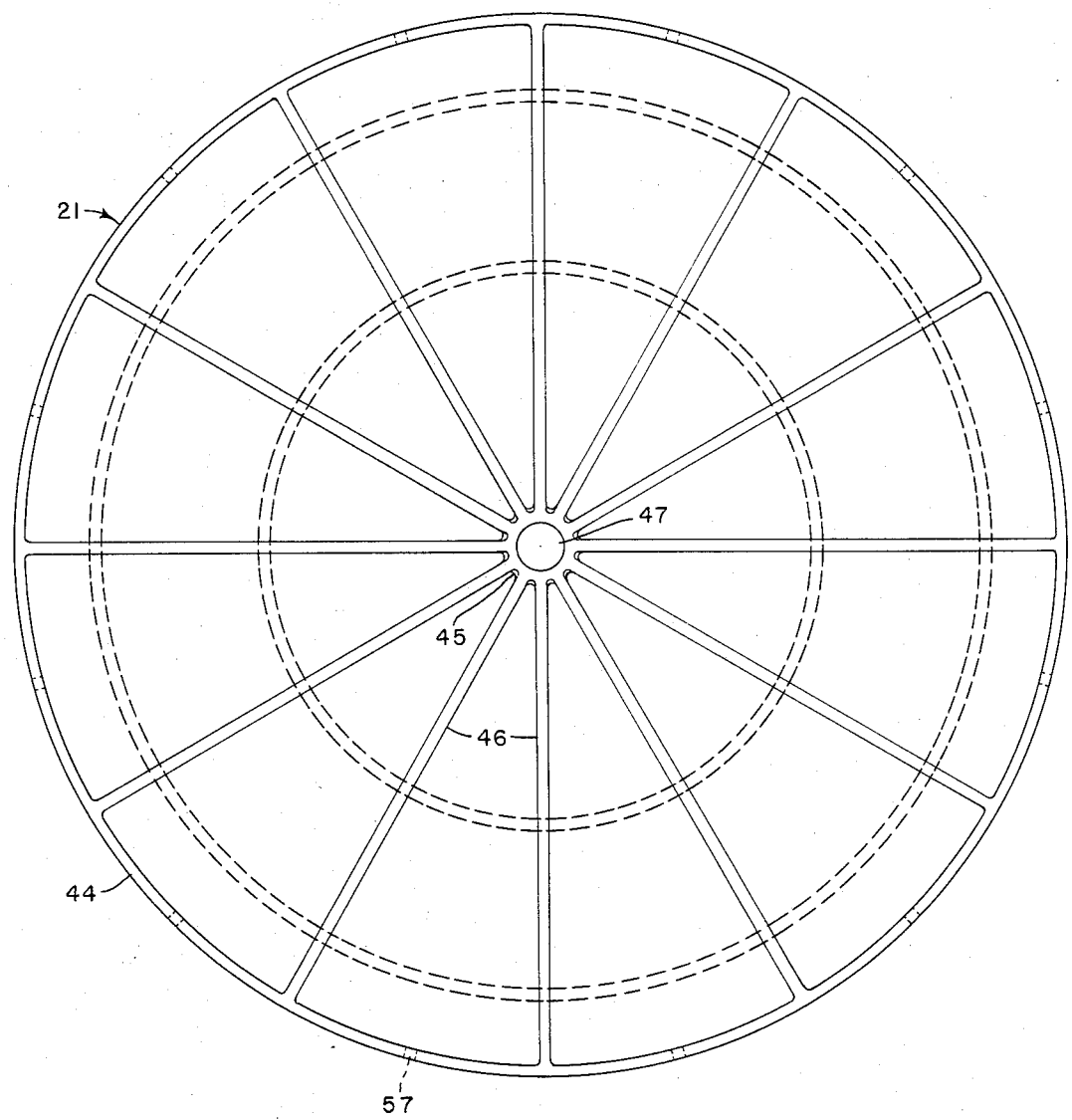
FIG. 4 is a top view of the upper tray.

Referring to FIG. 4, the upper tray has the peripheral flange 44 and the central box 45. The upper side of the tray has a group of radially-extending partitions 46 extending between the boss 45 and the flange 44 to provide sector-shaped compartments for the storage of small lures and other items. The central bore 47 of the boss 45 slideably receives the shaft 24. The underside of the top tray is provided with the concentric depending flanges 48 and 49, and each of these is perforated at regular peripheral intervals as shown at 50 and 51, respectively, to provide suspension points for engaging the hooks of fishing lures. The upper and lower trays, the wall 22, and the cover 26 are all annular, and are preferably molded of a transparent plastic material to provide an unobstructed view of the contents of the container. The cover 26 has a peripheral stiffening flange 52 and a sector-shaped opening 53 which can be placed above the space between the partitions 46 of the upper tray to expose the contents. The small projections 54 and 55 on the underside of the tray are spaced to rest on either side of any pair of partitions for location purposes. The flexibility of the cover 26, together with the resilience of the spring 27, combine to maintain enough pressure on the cover to render these projections effective. The small web 56 provides a finger grip for rotation of the cover to the desired position.

Any water that may enter into one of the compartments 46 through the opening 53 will drain out through one of the holes 57 in the peripheral flange 44 of the top tray.

Figure 2:
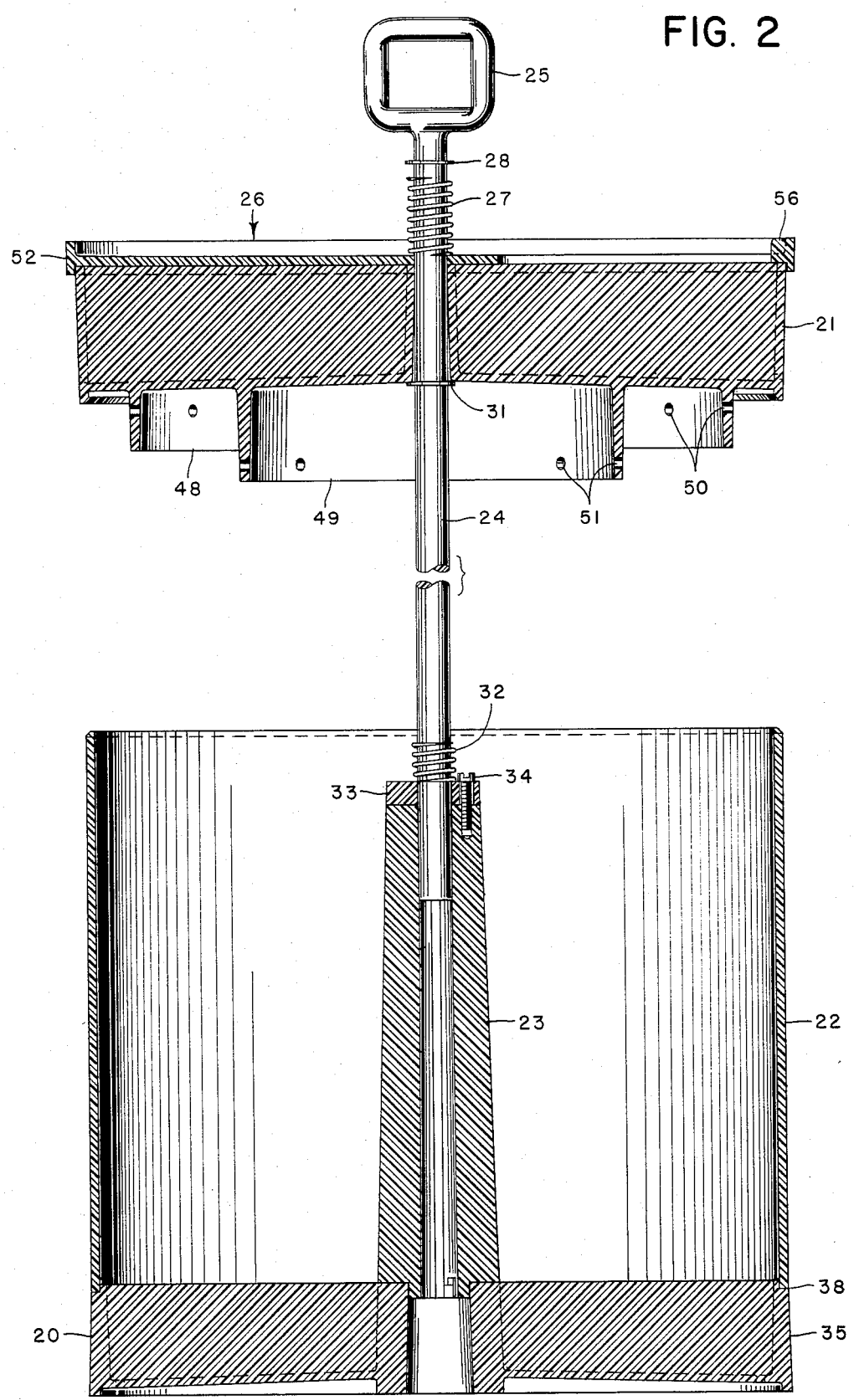
FIG. 2 is an axial section of the structure shown in FIG. 1, in the elevated position.
Figure 3:
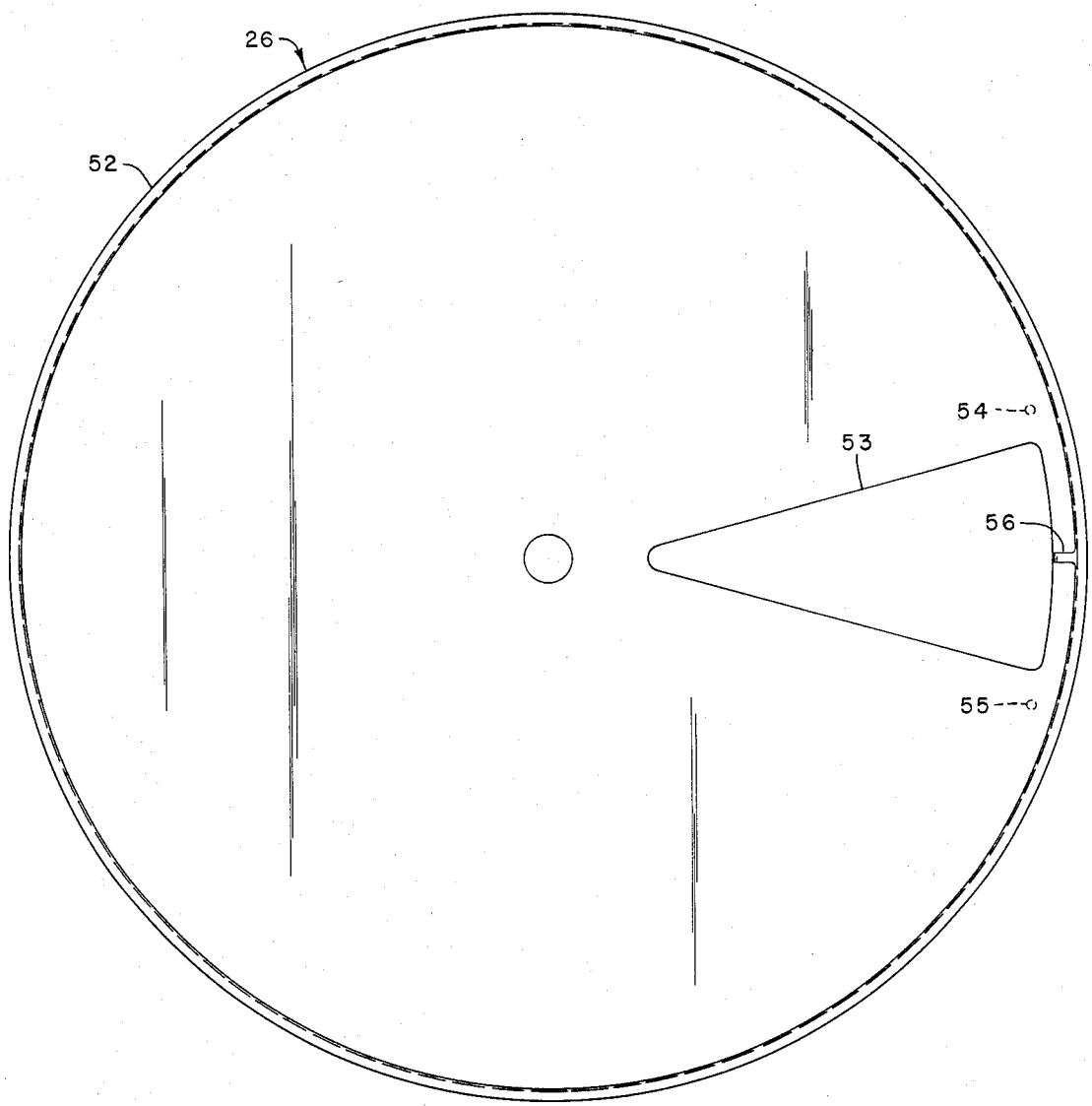
FIG. 3 is a plan view of the cover of the assembly.

The axial passage through the tubular post 23 has a keyhole-shaped configuration, as shown in FIG. 11. The cylindrical portion 58 has a radial extension 59 for accommodating the shaft 24 and the radially-extending pin 60. Sector-shaped portions of the lower extension 41 of the post are cut away at two different levels so that the shaft 24 can be pushed downwardly far enough for the pin 60 to clear the higher of these levels represented by the surface 61, and the handle can then be rotated slightly to bring the pin 60 axially opposite the adjacent surface 62, which is offset upwardly a sufficient amount to provide an entrapment for the pin 60 to prevent accidental back-rotation. When the pin 60 is axially opposite the radial extension 59 of the central opening in the post, the shaft and pin are free to slide from the FIG. 1 position to that shown in FIG. 2. Placement of the pin in position to do this must take place accompanied by the down-thrust on the handle 25 against the action of the spring 32. At the upper extremity of the movement shown in FIG. 2, the pin 60 engages the surface 63 of the chamber 64 in the underside of the cap 33, and then falls back on the top of the post 23. Part of the chamber 64 is axially opposite the end of the axial extension 59 of the central opening in the post (see FIG. 12), and the chamber 64 extends laterally (or angularly) from this position a sufficient amount to permit the pin 60 to rest against the top surface of the post when the lifting pressure on the handle is released. The pin is carried over the abutment 23a on the top of the post before releasing the handle 25 to prevent the pin 60 from accidentally slipping into the passage 59. Referring to FIGS. 8 and 9, the holes 65-67 in the cap are for receiving the screws 34 shown in FIG. 1. During the course of the upward movement from the FIG. 1 to the FIG. 2 position, the clip 31 on the shaft 24 engages the underside of the upper tray to form a lifting abutment carrying the upper tray and its cover.

I claim:

1. A tackle box including upper and lower trays and a protective wall surrounding the space between said trays, wherein the improvement comprises:
    a central tubular post secured at the lower extremity thereof to said lower tray perpendicular thereto, said post having at least a portion of the inside surface thereof formed with a keyhole configuration in cross-section providing a radially-extending portion and a surface extending laterally from said radially-extending portion adjacent the lower extremity of said post;
    means forming a cap secured to the top of said post, said cap and post together defining a sector chamber communicating with, and extending laterally beyond said radially-extended portion;
    a shaft traversing said tubular post, and having a radial pin adapted to traverse said radial extension and said sector chamber, said shaft having a handle at the upper extremity thereof, said shaft traversing said top tray and including abutment means engageable with said top tray to elevate said top tray on raising said handle.

2. A tackle box as defined in claim 1, wherein said upper tray has at least one depending member, having means for receiving a portion of a fish bait to suspend the same below said top tray.

3. A tackle box as defined in claim 2, wherein said depending member is a perforated flange.

4. A tackle box as defined in claim 1, wherein said lower extremity surface has an offset adjacent said radially-extending portion, and additionally including biasing means urging said handle upwardly to engage said radial pin with said lower extremity surface.

5. A tackle box as defined in claim 1, additionally including a cover box over said top tray, said cover being rotatable on said shaft.

6. A tackle box as defined in claim 5, wherein said cover has at least one opening, and additionally including biasing means urging said cover downward with respect to said handle against said top tray in at least the lower position of said shaft in which said radial pin is in engagement with said lower extremity surface of said post.

* * * * *